Jan. 25, 1966  R. C. MUELLER  3,230,640
TEACHING MACHINE

Filed Dec. 1, 1961  3 Sheets-Sheet 1

INVENTOR.
RICHARD C. MUELLER

INVENTOR.
RICHARD C. MUELLER

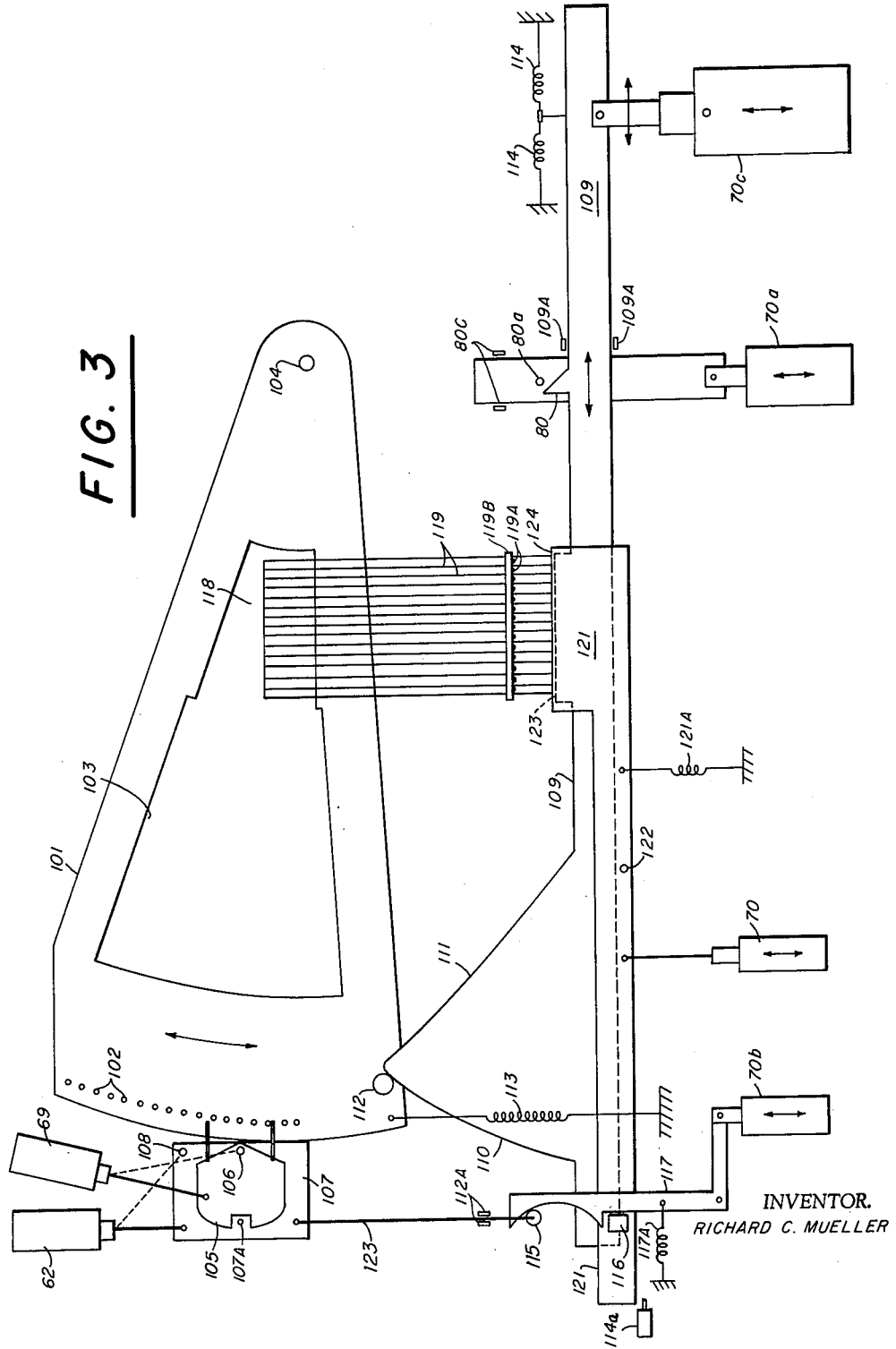

United States Patent Office 3,230,640
Patented Jan. 25, 1966

3,230,640
TEACHING MACHINE
Richard C. Mueller, 1355 Muirlands Vista Way,
La Jolla, Calif.
Filed Dec. 1, 1961, Ser. No. 156,248
7 Claims. (Cl. 35—9)

This application is a continuation-in-part of an application entitled "Teaching Machine," filed, July 10, 1961, Serial No. 122,731.

The present invention relates to a teaching machine and more particularly to a teaching machine utilizing a programmed input with alpha-numeric responding means.

According to the invention, a programmed stimulus is provided in the teaching machine which requires a response from the operator. The operator responds via alpha-numeric push buttons, each of which supply electrical current to a plurality of illuminating means. The programmed input also has a series of programmed apertures (in this application, aperture is defined as any translucent means) through which the illuminating means pass light to activate a photo-responsive means, which in turn, energizes a series of correct indicating means or in the alternative, a series of incorrect indicating means. The indicating means in the correct channel is mechanically coupled to a mask divided into segments. When the response has resulted in a correct answer, an input aperture energizes a solenoid which opens the mask exposing the full and correct answer. This is also true for a wrong answer, i.e., the entire correct answer is revealed. A further feature is utilized in the present invention consisting of a building-block mode whereby, as the response pulses are coupled through the correct channel, the answer is revealed by the removal of the mask in segments. Thus, the operator knows that he is correct insofar as he has gone. When the completed response is passed into the machine, a further solenoid opens the answer mask completely showing the correct answer to the student. It can be seen that the machine inherently provides for a "right enough" mode in that a further aperture or "fully correct" aperture could be spaced after a certain number (less than the full number) of correct responses is fed into the machine by the operator. Provision is also made to reverse the mechanical answer cam to allow the answer to be revealed from either direction in the building-block mode. Other features, such as scoring and timing, will be covered in detail.

It is thus an object of the present invention to provide a teaching machine with an alpha-numeric response means.

A further object of the present invention is the provision of a teaching machine in which a step-by-step or building-block mode is provided.

A still further object of the present invention is to provide a teaching machine utilizing automatic scoring.

Another object of the present invention is to provide a teaching machine in which the scoring is permanently recorded.

Yet another object of the present invention is the provision of an improved teaching machine which is extremely simple to operate, program and can be student loaded.

Still another object of the present invention is the provision of a teaching machine which is extremely versatile in various modes of operation and programming possibilities.

A still further object of the present invention is the provision of a teaching machine having a calibrated automatic timing feature.

Another object of the present invention is the provision of a teaching machine in which overtime of response is permanently recorded.

Still another object is to provide a teaching machine which is compact, inexpensive, reliable and requires very little maintenance.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 3 is a drawing showing the mechanical aspects of FIG. 1.

Figure 1:
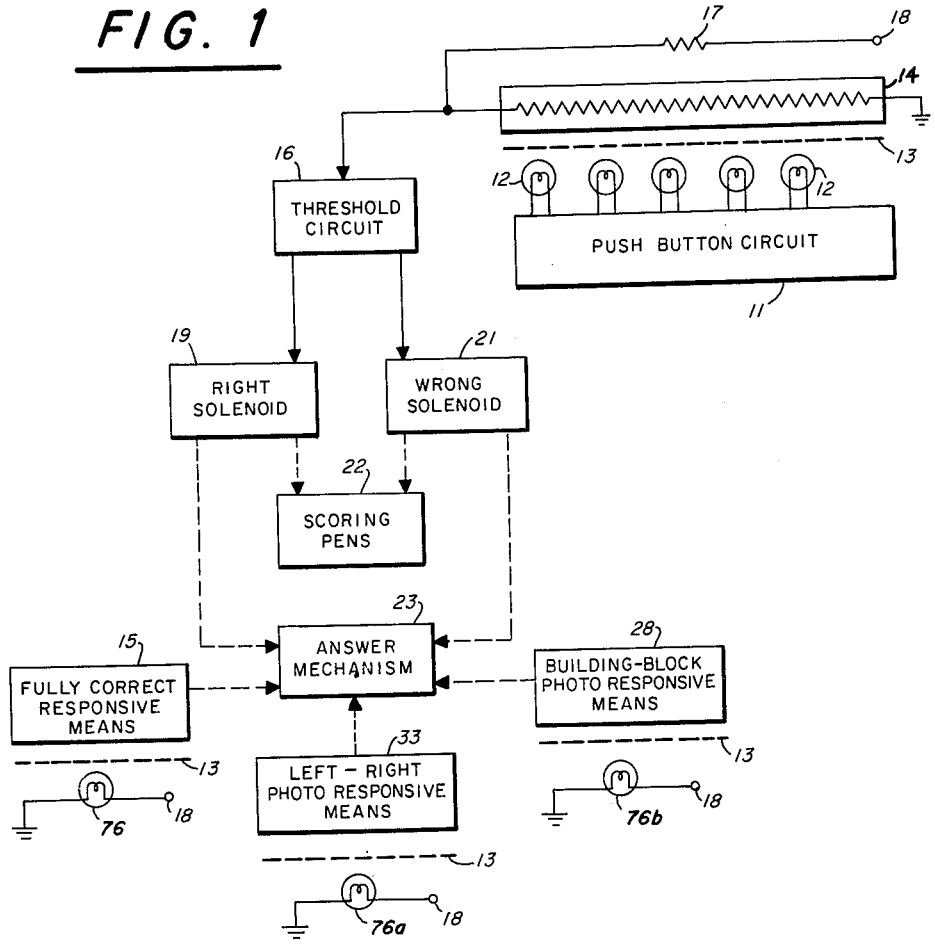
FIG. 1 is a simplified system block diagram of a preferred embodiment of the present invention.

Referring to FIG. 1, there is shown push button circuit 11 having lamps 12 connected thereto and apertured shutter 13 indicated in dotted lines. Photoresistor 14 is connected between ground and threshold circuit 16. Threshold circuit 16 is also connected through resistor 17 to terminal 18. The outputs of threshold circuit 16 are connected to correct solenoids 19 and wrong solenoids 21. The outputs of correct solenoids 19 are connected to scoring pens 22 and answer mechanism 23. The outputs of wrong solenoids 21 are also connected to scoring pens 22 and answer mechanism 23. Light 24 is connected between ground and terminal 18. Apertured shutter 13 is shown in dotted lines. Building-block photo-responsive means 28 is mechanically coupled to answer mechanism 23. Light 31 is connected between ground and terminal 18. Apertured shutter 13 is also physically positioned between light 31 and left-right photo-responsive means 33. Left-right photo-responsive means 33 is mechanically coupled to answer mechanism 23.

This is a functional diagram of the operation of the responding system. The operator desiring to answer the stimulus presented, pushes the alpha-numeric labeled buttons on the push button circuit board 11 which energizes a plurality of lamps indicated at 12. In a preferred embodiment, two lamps in a coded pattern are lighted from any one depressed button. If the answer or correct button is pushed, these two lamps will be opposite two programmed, coded apertures in shutter 13 which will allow light to pass and impinge upon photo-resistor 14, changing its resistance and supplying a pulse to threshold circuit 16. This is accomplished due to the change of current from ground to supply voltage 18. If the resistance change is great enough, i.e., the result of radiation from two lamps, an output will appear at the right solenoid block 19 and not at the wrong solenoid block 21. This will energize the right solenoids which causes a scoring pen 22 to mark a scoring wafer as a correct answer and energize and move answer mechanism 23. If answer mechanism 23 is set up for the "normal mode" of operation, the answer will not be revealed until the response is completed. If the "building-block mode" is desired, this is created by a further aperture in shutter 13 being programmed to appear opposite lamp 24, which will result in an input to building-block photo-responsive means 28 which mechanically changes the answer mechanism so the mask will reveal each step of the answer that has been entered by the push buttons as each is pressed. If a wrong response is fed into the machine via the push button circuit 11, i.e., it is wrong when one or no apertures are opposite lighted lamps 12, then an output is taken from the threshold circuit into the wrong solenoid 21 and a wrong response is recorded by scoring pens 22, and unless the building-block mode is being utilized, answer mechanism 23 is mechanically engaged to reveal the correct answer at that point. In building-block mode a wrong push button response does not reveal the full correct answer, so the student tries again. When the operator has completed a correct response, or has gone far enough with a correct response rendering further responses unnecessary, another aperture in shutter 13 will appear between lamp 30 and fully correct response means 15. This is also mechanically coupled to answer mechanism 23, which causes the correct answer to be completely revealed. A further feature of the invention is shown as a left-right photo-responsive means 33. This is to allow the answer to be revealed from either direction in the building-block mode. It is energized, as was the photo-responsive means 28, via a further programmed aperture in shutter 13, being opposite lamp 31.

Figure 2:
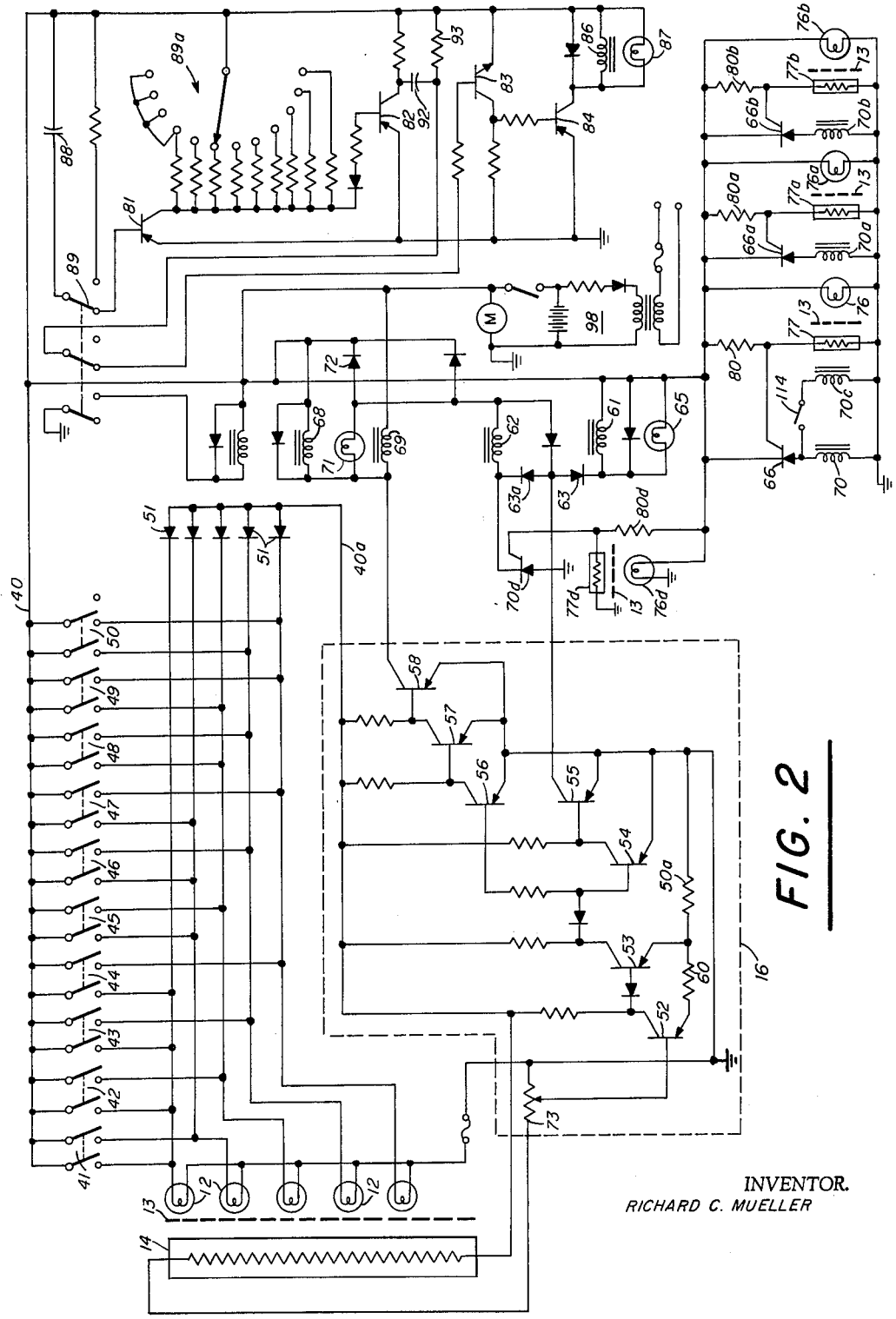
FIG. 2 is a schematic representation of a preferred embodiment of the present invention.

Referring to FIG. 2 there is shown a schematic representation of the present invention. The input alphanumeric push buttons are shown at switches 41 through 50. Light bulbs 12 are connected in various pairs through these switches to a supply voltage bus indicated as 40. It can be seen that when any one button is depressed of push buttons 41 through 50, one side of a different pair of light bulbs 12 will be supplied with electric current, the other side of light bulbs 12 all being tied to a common terminal or ground. Diodes 51 couple any potential on line 40 through switches 41 and 50 to supply bus 40a which is the negative voltage applied to the collectors of transistors 52, 53, 54, 55, 56, 57 and 58. Thus, when any button or switch 41 through 50 is depressed, an operating potential will be applied to bus 40a through one of rectifiers 51. Of course, diodes 51 are necessary to keep this voltage off the other lamps when one or more is lighted.

The operation of the transistor threshold circuitry will now be described. Before any photo-resistor signal is applied, if an operating voltage were placed on bus 40a, transistors 52, 54, 56 and 58 are all cut off and transistors 53, 55 and 57 are all conducting. It will be noted that all of the transistors in the circuit are of the PNP type, i.e., requiring a negative operating voltage on their collectors. Thus quiescently, if the wrong button were depressed, for example, and no signal at all were applied to the correct lamps, resulting in no illumination impinging upon photo resistor 14, and no signal applied to the base circuit of transistor 52, transistor 52 would remain cut off leaving transistor 53 conducting and transistors 54 and 56 cut off. This would result in leaving transistor 57 conducting and transistor 58 cut off resulting in no output at the collector of transistor 58 and the correct solenoids would not be energized. Transistor 55, however, would be conducting and the incorrect or wrong scoring solenoid 61 and mask solenoid 62 would be energized, the scoring solenoid 61 being connected directly to bus 40a and to the collector of transistor 55 through diode 63, and mask solenoid 62 being tied directly between the collector of transistor 55 and through diode 72 to bus 40a. Wrong lamp 65 would turn on, indicating a wrong answer and the answer mask would be removed revealing the correct answer as will be explained with reference to FIG. 3.

If a correct button were depressed, the correct lamps would light being opposite apertures in shutter 13 resulting in radiation impinging upon photo-resistor 14 from two of the lamps 12. This would result in a signal being applied to transistor 52 turning it on and all of the transistors in the circuit being direct coupled would reverse their conditions, i.e., the transistors which are quiescently cut off would then be conducting and the transistors which are quiescently conducting would then be cut off. This would result in no signal at the output of transistor 55 and a signal or current being present in the collector of transistor 58. This will energize scoring solenoid 68 and sampling solenoid 69, which are tied directly to bus 40, and a correct light 71 will be illuminated which is tied through diode 72 to bus 40. Emitter resistors 50a and 60 will hold transistor 52 cut off by current through transistor 53 and with no input signal, resulting in the above mentioned quiescent conditions. Since the biasing techniques of the transistor circuit are well known to those skilled in the art, further explanation is deemed unnecessary. Potentiometer 73 is utilized as a volume control in conjunction with photo-resistor 14. This is adjusted so that a signal from one lamp will not bring transistor 52 out of cut-off but that a signal from two lamps will. Thus, an ambiguity requiring a separate lamp for each switch is obviated and programming can be accomplished more compactly.

Light bulbs 76, 76a and 76b are all energized through bus 40. Controlled silicon diodes 66, 66a and 66b are all tied in parallel with light bulbs 76, 76a and 76b through solenoids 70 and 70c in parallel, 70a and 70b in their respective emitter circuits. Resistors 80, 80a and 80b are connected in series with photo-resistors 77, 77a and 77b, respectively, between ground and bus 40, having their junctions connected to the control elements of diodes 66, 66a and 66b, respectively. There is interposed between light bulbs 76, 76a and 76b and photo-resistors 77, 77a and 77b, respectively, a disc 13, shown in dotted lines, with a programmed aperture for passing light from each light bulb through said aperture for an impingement of light on said photo-resistors when said apertures are so programmed. All the circuits work identically so the theory of only one will be described. When no aperture is present between any of the light bulbs and their respective photo-resistors, the photo-resistor and resistor combination between bus 40 and ground is such that the controlled diodes are either cut off or draw very little current through their respective solenoids. When a programmed aperture appears between one of the light bulbs and its associated photo-resistor, light impinges upon the photo-resistor, lowering its resistance and, in effect, firing the controlled silicon diode connected thereto. When this happens, the relay or solenoid winding in the anode circuit of the fired controlled silicon diodes will be actuated. The purpose of each of these photo-controlled circuits will be explained with reference to FIG. 3. Controlled silicon diode 70d, together with resistors 77d and 80d and light 76d operate in the same manner as the other controlled silicon diodes through a programmed aperture in shutter 13. This is utilized to actuate solenoid 62 and wrong light 65 when the answer is completed or is "proof enough." Diode 63a prevents scoring solenoid 61 from being actuated when diode 70d is fired.

The timing circuit operates in the following manner: when the equipment is turned on, power is supplied via bus 40a to transistors 81, 82, 83 and 84. Transistors 81, 82 and 84 are of the PNP type and transistor 83 is an NPN type. Initially both transistors 83 and 84 are cut off due to zero bias being applied at their base elements, resulting in no current floiwng through overtime solenoid 86 and overtime indicator light 87 not being illuminated. As the equipment is turned on and voltage is applied to bus 40a, capacitor 88 begins charging through switch 89 and the base-emitter of transistor 81. This will result in a sawtooth waveform appearing at the base of transistor 81, which in turn will be amplified in transistor 81, and appear at the base of transistor 82. The signal at the base of transistor 82 will have an amplitude dependent upon the value of the resistance in the collector of transistor 81 as selected by switch 89a. Transistor 82 was conducting hard, resulting in capacitor 92 acquiring a charge positive on the collector of transistor 82 and negative on the other side thereof. The sawtooth waveform at the base of transistor 82 going in a negative direction will cause transistor 82 to conduct more heavily, resulting in a more positive voltage at its collector, i.e., less negative and cause capacitor 92 to charge through resistance 93. This will cause transistor 83 to conduct, and, in turn transistor 84 to conduct which energizes overtime solenoid 86 and turns on overtime light 87. Overtime solenoid 86 actuates an overtime marker which indicates to the scorer that more than the alloted time was utilized in arriving at the response. This timing circuit is merely exemplary and is not to be taken as limiting the invention since any timing expedient can be utilized.

Referring now to FIG. 3 there is shown master arm 101 having spacer pegs 102, question or stimulus aperture 103 and pivot point 104. In the position shown, master arm 101 is spring biased in a downward direction by coil spring 113, but held in place by escapement mechanism 107.

Solenoids 69 and 62 are mechanically coupled to escapement mechanism 107, consisting of two parts; the armature 105 is mounted on base 107. Solenoid 62 rotates escapement mechanism base 107 about pivot point 108 and solenoid 69 rotates escapement armature 105 in rocker fashion about pivot point 106. Space bar 109 has cams 110 and 111 at one end thereof with cam follower 112. Space bar 109 is spring loaded to the normal position shown, i.e., center by coil springs 114. Answer aperture 118 of master arm 101 is covered in the start position by answer covering segments 119. These segments are spring biased to drop down when not held by segment return lever 121 in the up position as shown.

Segment return lever 121 is mechanically coupled to solenoid 70 and is pivotally mounted at 122 in proximity to space bar 109. In the normal mode, i.e., not the building-block mode, segment return lever 121 is pulled up to the position shown by solenoid 70. Thus, surface 124 of segment return lever 121 will come in contact with answer segments 119 providing clearance from the surface 123 of space bar 109. In operation, assuming the left to right response is being entered, the answer segments will reveal the answer from left to right, or space bar 109 will move from left to right. Upon receiving a correct stimulus, solenoid 69 will be actuated which will pivot escapement 105 and allow master arm 101 to drop by one peg of the train of pegs 102. This will push space bar 109 to the right via cam follower 112. Each correct response then will energize solenoid 69 causing escapement mechanism 105 to move allowing master arm 101 to move in a downward direction by one peg. This causes space bar 109 to move to the right until the "proof enough" or "correct" aperture is positioned in front of light bulb 76d of FIG. 2, causing solenoid 62 to energize, removing escapement mechanism 107 from pegs 102, allowing master arm 101 to drop moving space bar 109 completely to the right and allowing answer masking segments 119 to drop when segment return lever 121 is released from latch 116 by the mechanical action of linkages 123 and 117.

In the building-block mode, segment return lever 121 is dropped from the position shown since solenoid 70 is de-energized and solenoid 70b unlatches the lever 121 via the linkage 117. As space bar 109 is moved to the right or left by cam follower 112, the answer segments 119 will drop, one at a time, revealing the answer and showing the student that he is correct so far.

As explained with reference to FIG. 2, solenoids 70, 70a and 70b and 70c are all program-aperture actuated, i.e., whenever it is desired to have one of these solenoids actuate, an appropriate aperture will appear opposite the corresponding illuminating means, allowing light to impinge upon the corresponding photo-resistor.

"Right-to-left" solenoid 70a moves the space bar 109 far enough to the left via cam 80 and cam follower 80a. This positions cam 111 with respect to cam follower 112 so that it will push bar 109 to the left since it has been positioned to follow cam 111.

Centering solenoid 70c is pivotally mounted and mechanically coupled to space bar 109. As space bar 109 is moved to the right or left, the solenoid is pivoted into a position whereby, if actuated, it will pull space bar 109 to its mid position. This centering action is helped by coil-springs 114 though their primary purpose is to keep cam follower 112 tightly against the cam. Solenoid 70c is actuated after segment return lever 121 is pulled into the position and latched as shown. This is accomplished by switch 114 in series with solenoid 70c. By referring to FIG. 2, it can be seen that solenoid 70c receives its current in parallel with segment return solenoid 70, but not until micro-switch 114a is closed, insuring that segment return lever 121 has pushed spring biased segments 119 clear of space bar 109.

Guides for space bar 109, relay 70a, and cam follower 112 are shown at 109a, 80c and 112a, respectively. Springs 119a are mechanically mounted on segments 119, and biased by a bar 119b, mounted over segments 119. Coil springs 117a and 121a mechanically bias linkage 117 and lever 121, respectively. Pin 122 serves as a guide for space bar 109 and a pivot point for lever 121.

Additional features can be easily utilized in conjunction with the present invention. For example audio stimulus can be very easily incorporated through the use of recorded cartridge tapes which can be aperture programmed to start, stop or replay as dictated by the response of the operator.

Thus, an extremely versatile, yet inexpensive and simple to operate, teaching machine has been described in accordance with the objectives outlined.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A teaching machine of the type utilizing a programmed input including stimulus and responses comprising a plurality of alpha-numeric responding means electrically coupled to a plurality of illuminating means, photo-responsive means in operable proximity with said illuminating means, programmed shutter means having a plurality of programmed apertures interposed between said illuminating means and said photo-responsive means, threshold means connected to the output of said photo-responsive means, mounting means having spacing means thereon, escapement means in operable contact with said spacing means, at least one actuating means connected for actuation to said threshold means and operably connected to said escapement means for causing movement of said escapement means, at least one opening in said mounting means in visual communication with a correct response thereunder, correct response concealing means disposed over and covering said correct response, cam means in contact with said correct response concealing means, cam follower means mounted on said mounting means for moving said cam means when said actuating means is activated, thereby exposing said correct response said indicating means operable to indicate a correct answer after a predetermined plurality of consecutive responses.

2. The teaching machine of claim 1 wherein said programmed shutter means comprises a light shield having translucent apertures.

3. The teaching machine of claim 1 wherein said illuminating means comprises a plurality of electric lights.

4. The teaching machine of claim 1 wherein said photo-responsive means comprises a photo-sensitive resistor and a non photo-sensitive resistor connected in serial relationship across a supply voltage and having a junction connected to the input of said threshold means.

5. The teaching machine of claim 1 including mode changing means, mechanically coupled to said response concealing means, for changing from a normal mode to a building block mode wherein said correct response is revealed progressively in steps as a correct response is received from an operator.

6. The teaching machine of claim 5 including a right-left mode selecting means mechanically coupled to said cam follower means moving said cam means with respect to said cam follower means for determining the direction of movement of said cam means, in response to said cam follower means.

7. The teaching machine of claim 1 including recording means operable to produce a permanent distinct record of each correct, incorrect and overtime response.

References Cited by the Examiner

UNITED STATES PATENTS

| | | | |
|---|---|---|---|
| 2,311,055 | 2/1943 | Kopas | 35—9 |
| 2,401,434 | 6/1946 | Mills | 35—48 |
| 2,402,162 | 6/1946 | Holt | 35—9 |
| 2,835,052 | 5/1958 | Raich et al. | 35—9 |
| 3,052,041 | 9/1962 | Luxton et al. | 35—9 |

JEROME SCHNALL, *Primary Examiner.*

LEO SMILOW, GEORGE A. NINAS, JR., *Examiners.*